United States Patent [19]
Gadelle et al.

[11] Patent Number: 5,242,021
[45] Date of Patent: Sep. 7, 1993

[54] METHOD AND DEVICE FOR CONSOLIDATION A FORMATION CROSSED BY A WELL

[75] Inventors: Claude Gadelle, Rueil-Malmaison; Jacques Lessi, Maule, both of France

[73] Assignee: Institut Francais Du Petrole, Rueil-Malmaison, France

[21] Appl. No.: 787,406

[22] Filed: Nov. 4, 1991

[30] Foreign Application Priority Data

Nov. 2, 1990 [FR] France .................................. 90 13693

[51] Int. Cl.$^5$ ........................ E21B 43/24; E21B 36/00
[52] U.S. Cl. ..................................... 166/292; 166/306
[58] Field of Search ................ 166/285, 290, 291, 292, 166/306, 50

[56] References Cited

U.S. PATENT DOCUMENTS 4,565,245 1/1986 Mims et al. ...................... 166/306 X
4,640,359 2/1987 Livesey et al. .................. 166/306 X Primary Examiner—William P. Neuder
Attorney, Agent, or Firm—Antonelli, Terry, Stout & Kraus

[57] ABSTRACT

The method relates to the application to a deflected well (1) of a well-known consolidation process through the polymerization in situ of a liquid substance (L) injected within a zone (2) to be consolidated through an injection pipe (5), by interaction with a reacting gas G injected thereafter. In order to limit the zone of intervention and to properly distribute the substance and the gas all over this zone, a combination of a pipe whose wall is fitted with openings (11) all over the end part thereof (5a), a confining packer (8) and a solid separation element (10) displaced in the pipe after the liquid substance by the reacting gas, which prevents any interaction of the reacting gas before it reaches the zone to be consolidated, is used. Injecting the liquid mixture comprises successive stages of circulation between the inside of pipe (5) and the annulus between the pipe and the well (1) and of forcing to have it make through the formation properly. It is generally preceded by a stage of injection of solvent products.

9 Claims, 1 Drawing Sheet

METHOD AND DEVICE FOR CONSOLIDATION A FORMATION CROSSED BY A WELL

BACKGROUND OF THE INVENTION

The object of the present invention is a method and a device for consolidating a geologic formation crossed by a deflected well by means of a substance which is polymerized in situ by injecting a gas. One possible application of the invention is the consolidation of deflected wells drilled through subterranean reservoir zones containing petroleum effluents brought into production.

The Oxpol and Thermopol processes (OXPOL and THERMOPOL are trademarks registered by the applicant), which are notably described in the French patents 2,474,558 and 2,575,500, are used to consolidate wells drilled in permeable geologic formations containing petroleum effluents. They are for example applied in producing wells crossing sandy zones and allow to stop sand advents.

The process mentioned above provides the consolidation of a permeable zone through the injecting of a polymerizable substance in situ which binds the non consolidated elements of a formation.

This substance can be a liquid mixture of organic products containing at least one polymerizable chemical compound and a catalyst, and this mixture can be polymerized in contact with an oxidizing gas (OXPOL process). The reaction starts at the normal temperature of the formation. It is exothermic and leads to the forming of a polymeric film which binds the unstable particles of the formation and makes it cohesive, without notably modifying the permeability thereof. The process is applied to vertical wells and comprises the successive injecting of the mixture and of the oxidizing gas, separated by a volume of a little oxidizable substance such as a solvent or a petroleum cut in order to prevent a premature reaction.

This substance may also be a mixture of liquid organic products likely to polymerize through a temperature rise (THERMOPOL process). This is achieved after introducing the mixture into the formation by the injection of a chemically inert hot gas.

With the previous techniques, the extent of the reaction can be controlled by adjusting the composition of the polymerizable mixture and the features of the reacting gas. The flow of gas passing through the volume to be consolidated eliminates the risks of clogging by the formed polymer.

The influence of gravity contributes to facilitating the implementing of the process in vertical wells or wells little inclined in relation to the vertical. It has a useful effect on the displacement of the injected constituents in order to obtain a good penetration into the formations to be plugged. The reacting gas injected after the organic mixture tends to remain above the mixture and, as seen above, a fluid volume is sufficient to maintain the separation and to prevent a premature reaction. The implementing of such a process in wells part of which is horizontal or almost horizontal presents particular difficulties because gravity has a less favourable effect for displacing the constituents and for separating the liquid mixture from the reacting gas.

SUMMARY OF THE INVENTION

The method according to the invention allows to adapt the processes of consolidation of formations by hot polymerization such as the Oxpol process to the deflected parts of wells drilled through unstable formations and notably horizontal or nearly horizontal parts. It comprises the injecting within the zone to be consolidated, by means of an injection pipe, of a liquid substance polymerizable under the action of a reacting gas, followed by the injecting, through the same pipe, of an amount of said gas suitable for the polymerization in situ of the liquid substance.

The method comprises :

distributing the liquid substance and the reacting gas all along a length of a deflected well to be consolidated by means of a pipe with an end part fitted with lateral openings distributed along this end part, and inserting a solid separating means between the liquid substance and the reacting gas in order to prevent the interacting thereof as long as the gas has not reached said end part of the injection pipe.

The injection of the liquid substance comprises for example at least one first stage of circulation between the inside of the pipe and the annular space around the pipe and at least one stage of pressurization of the liquid substance in order to force the making through the formation to be consolidated of the liquid substance over a given thickness around the well, and the injection of the reacting gas comprises the limiting of the zone to be consolidated by inserting between this zone and the rest of the well at least one confining part such as a packer.

The method according to the invention preferably comprises the confining of a zone to be consolidated by inserting two confining parts on either side of said zone.

The liquid substance and the reacting gas are made interact by the escaping of the gas through the lateral openings of the end part of the injection pipe.

Solvent products can also be injected through the pipe before injecting said liquid substance.

The method can for example comprise operations of removal of non consolidated material obstructing said zone of intervention.

The device for the implementing of the method allowing to consolidate the walls of a zone in a deflected well drilled through a friable geologic formation comprises an injection pipe, injection means adapted for successively injecting within the zone to be consolidated a liquid substance polymerizable under the action of a reacting gas and thereafter an amount of said gas suited to the polymerization in situ of the liquid substance, and confining means for isolating the part of the well crossing the zone to be consolidated. The device also comprises separation means displaceable within the injection pipe to separate the liquid substance and the reacting gas injected one after the other in the pipe and to prevent their interacting outside the zone of intervention, said pipe comprising an end part communicating with the well and fitted with openings distributed all along this end part.

The end part of the injection pipe can be surrounded with an oblong coupling whose wall is crossed by ports distributed on at least part of the length thereof, said coupling communicating with the pipe through openings provided in the wall of the pipe at a given distance from the end thereof, the device then comprising also means for connecting the pipe with the coupling intermittently.

The communication means between the pipe and the coupling comprise for example a ring displaceable within the pipe between a position where said openings are screened and an off-position, the ring comprising a thrust for said separation means, the displacing of this means resting against said thrust having the effect of uncovering said openings.

BRIEF DESCRIPTION OF THE DRAWINGS

Other features and advantages of the process and the device according to the invention will be clear from reading the description hereafter of two embodiment procedures given by way of non limitative examples, with reference to the accompanying drawings in which.

DESCRIPTION OF THE PREFERRED EMBODIMENTS

Figure 1:
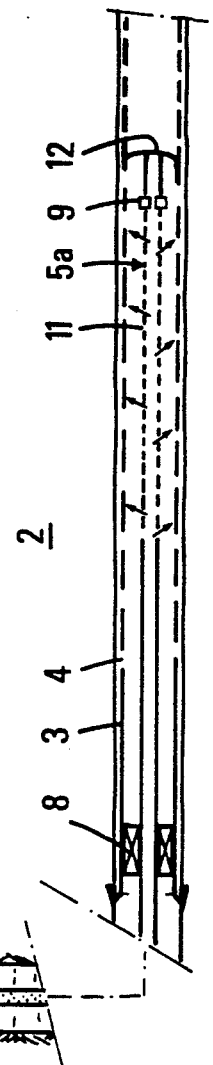
FIG. 1 diagrammatically shows the injection device installed in a well to be consolidated.

The first embodiment procedure of the method according to the invention is applied in a well 1 at least part of which is deflected. This part is drilled through a permeable and unstable layer 2. It may be for example a sandy layer. A casing 3 possibly kept in place by cementing is installed in well 1. The casing 3 is fitted with perforations 4 in the part thereof which crosses the formation 2 producing petroleum effluents.

In order to stabilize the formation in the zones where it is unstable and to prevent sand advents through casing 3, an injection pipe 5 through which an organic mixture polymerizable under the action of a gas and a volume of this gas sufficient to produce an exothermic polymerisation reaction will be successively introduced is taken down into the well. The pipe 5 is connected with a surface injection system 6 comprising a liquid pumping assembly 6A and a gas compression assembly 6B by means of an injection valve 7a. An ejection valve 7b controls the discharge of fluid outside the annular space around pipe 5. The section of the lower end part of pipe 5 is close to the section of casing 3 in order to facilitate the making through the formations surrounding the well of the injected products. Close to the zone to be treated, between the zone and the surface, the pipe 5 is externally associated with a confining part 8 of the packer type for example, likely to close the annulus between the pipe 5 and the casing 3 on request. A seat 9 for a sliding plug 10 is associated with pipe 5 at the lower end thereof.

The injection pipe 5 comprises an injection end section 5a fitted with calibrated lateral openings 11 in order to distribute the reacting gas better and to obtain an improved diffusion of the gas on a larger volume of the formation crossed by the well. A pipe scraper 12 with a section close to the section of the casing 3 can be adapted at the end of the terminal part in order to push back the sand it may contain towards the bottom of the well.

The packer 8 being open, solvent products start being injected into pipe 5, preferably several successively. A sufficient amount of the first solvent is injected, which corresponds to several times the volume of the annulus around the injection end part 5a, in order to properly clear this part of the well of all the petroleum effluents it contains. The ejection valve 7b is then closed in order to force the solvent to make through the formation and to clean the zone around the well.

A second solvent is preferably injected to clear the well of the first solvent and the water, then, if necessary, a third solvent is injected to remove the second one. The intermittent closing of the ejection valve 7B forces the successive solvents into the formation.

The setting of the constituents for the polymerization can begin thereafter.

A mixture L of substances polymerizable under the action of a gas G such as defined in the two French patents cited above for example is injected. The rate of inflow is increased by opening the ejection valve 7b as long as the initial circulation pressure has not been recovered. The mixture is circulated until the same surplus volume is obtained in return (several times the volume of the annulus as previously). The closing of the ejection valve 7b forces the mixture to enter the total peripheral zone to be consolidated around the well. At the end of this injection stage, the pipe 5 is filled with a slightly overpressurized mixture.

The packer 8 is then closed in order to restrict to the zone to be consolidated the polymerization action to be achieved. The plug 10 is introduced into the injection pipe 5 and it is propelled by an injection of a reacting gas, an oxidizing gas or a hot gas according to the variant of the process used. The plug 10 allows to maintain the liquid mixture L contained in the pipe separated from the gas G which pushes it towards the zone of intervention, especially in the horizontal parts where the interface between them increases and becomes unstable. While moving, it forces the liquid mixture which still is in the pipe 5 to make through the formation to be consolidated and it cleans the pipe. When the plug 10 reaches the injection end section 5a of pipe 5 provided with openings 11, a part of gas G starts escaping into the pipe-casing annulus and making through formation 2. The plug continues to move because the pressure drops due to the gas escape are sufficient. If the injection pressure is sufficient, the plug rests against the seat 9 at the end of pipe 5.

The injected gas reacts with the liquid mixture in the part of the formations surrounding the well on at least part of the length of the end section 5a. The amount of injected gas is sufficient to stabilize the formations without notably modifying the permeability thereof.

Figure 2:
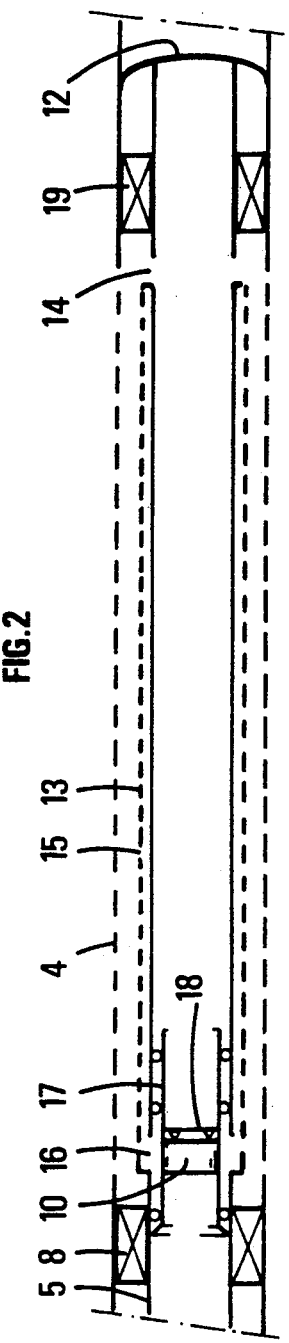
FIG. 2 shows a variant of the previous embodiment procedure allowing an improved gas delivery.

According to the embodiment procedure of FIG. 2, the end part 5a of the injection pipe is bordered by a coupling 13. The end part 5a communicates with the well 1 towards the end 14 thereof. The coupling 13 is fitted with ports 15 distributed all along it and communicates with the pipe through portholes 16 which can be opened intermittently. They are for example screened by a ring 17 sliding within the end part 5a and inwardly fitted with a seat 18 for the plug 10. The portholes are normally screened by the ring.

The liquid mixture L is pushed back into the pipe-casing annulus through the end openings 14. The plug 10 coming in under the pressure of the reacting gas pushes the ring 17, which uncovers the portholes 16 and allows the gas to enter totally the coupling 13, and then between the coupling and the casing 3.

This delayed opening allows to separate better the functions of circulation and of forcing of the liquid into the formations surrounding the well from the function of injection of the gas.

In case the zone to be consolidated is larger than the length of the end section 5a of the injection pipe beyond the packer 8, successive stages can be achieved. In this case, another packer 19 is installed towards the end of pipe 5 and all the previous injection operations are carried out for each portion of the zone delimited by the two packers 8, 19.

In order to make the consolidation operations more effective, they can be preceded by stages of cleaning of the well in case it is more or less obstructed by material from the formation. Different well-known techniques are used in this case desanding by means of a specialized tool, displacing the material out of the zone by scraping, driving by a flow of liquid at high speed, injection of water and gas, etc.

We claim:

1. A method for consolidating the walls of a deflected well drilled through a friable unstable geologic formation comprising injecting within the zone to be consolidated by means of an injection pipe, liquid substance (L) polymerizable under the action of a reacting gas (G), followed by injecting through the same pipe, an amount of said gas suited to effect the polymerization in situ of the liquid substance, and distributing the liquid substance and the reacting gas over a length of a deflected well to be consolidated by means of a pipe with an end part fitted with lateral openings distributed all along it, and inserting a solid separation means between the liquid substance (L) and the reacting gas (G) in order to prevent the interacting thereof as long as the gas has not reached said end part of the injection pipe.

2. A method as claimed in claim 1 wherein the injection of the liquid substance comprises at least one first stage of circulation between the inside of the pipe and the annular space around the pipe, and at least one stage of pressurization of said substance in order to force the substance through the formation to be consolidated over a given thickness around the well, and the injection of reacting gas comprises limiting the zone to be consolidated by inserting between the zone and the rest of the well at least one confining part.

3. A method as claimed in claim 1 or 2 further comprising confining of a zone to be consolidated by inserting two confining parts on either side of said zone.

4. A method as claimed in claims 1 or 2 wherein interacting of the liquid substance and of the reacting gas is due to the escaping of the gas through the lateral openings of the end part of the injection pipe.

5. A method as claimed in claim 4 wherein solvent products are injected through the pipe before injecting said liquid substance.

6. A method as claimed in claim 1 or 2 further comprising effecting removal of non-consolidated material obstructing said zone of intervention.

7. A device for consolidating the walls of a zone of a deflected well drilled through an unstable geologic formation which comprises an injection pipe, injection means adapted for successively injecting within the zone to be consolidated a liquid substance (L) polymerizable under the action of a reacting gas (G) and thereafter an amount of said gas suited to the polymerization in situ of the liquid substance, confining means for isolating the part of the well crossing the zone to be consolidated, and separation means displaceable within the injection pipe to separate the liquid substance (L) and the reacting gas (G) injected one after the other in the pipe and to prevent the interacting thereof outside the zone of intervention, said pipe comprising an end part communicating with the well and fitted with openings distributed all along the end part.

8. A device as claimed in claim 7 wherein the end part of the injection pipe is bordered with an oblong coupling whose wall is fitted with ports distributed on at least part of the length thereof, said coupling communicating with the pipe through openings provided in the wall of the pipe at a given distance from the end thereof, the device also comprising means for intermittently connecting the pipe with the coupling.

9. A device as claimed in claim 8 wherein the means for connecting the pipe with the coupling comprise a ring displaceable within the pipe between a position where said openings are screened by the ring and an off-position, said ring comprising a thrust for said separation means, the displacing of this separation means resting against said thrust having the effect of uncovering said openings.

* * * * *